United States Patent Office 3,077,459
Patented Feb. 12, 1963

3,077,459
AQUEOUS EMULSION OF A WATER INSOLUBLE, DRYING OIL MODIFIED POLYESTER RESIN AND A WATER SOLUBLE, DRYING OIL MODIFIED POLYESTER RESIN
Alan U. Hershey, Garden Grove, Henry S. Zack, Orange County, and Kevin A. Worrall, Pico Rivera, Calif., assignors to McCloskey Varnish Co. of the West, Los Angeles, Calif., a corporation of California
No Drawing. Filed Dec. 7, 1959, Ser. No. 857,509
6 Claims. (Cl. 260—22)

This invention relates to improved aqueous emulsions and to a process for producing them. More particularly the present invention relates to the emulsification of water insoluble oil modified polyester resins.

Oil modified polyester resins have many useful properties as industrial or architectural coatings. Because of certain inherent advantages of water as a vehicle in applying such resins, efforts have been made heretofore to emulsify polyester resins with water. However, the emulsifying agents used heretofore have had a tendency to remain in the coating whereby the coating remains water soluble or water sensitive even after evaporation of the water vehicle.

It is an object of the present invention to prepare a water emulsion of polyester resins adapted to be used for industrial or architecutral coatings and which after drying will provide a film of desirable qualities having low water sensitivity.

Another object is to provide a new and improved process for forming water emulsions of water insoluble, oil modified polyester resins.

A further object is to provide water emulsions of polyester resins of low acid value.

Still another object is to provide oil modified polyester resin emulsions of extremely fine particle size.

Other objects and advantages will become more apparent hereinafter.

Our discovery in brief is that water insoluble, oil modified polyester resins may be emulsified by utilizing water soluble, oil modified polyester resins as emulsifiers.

As used in this specification and the accompanying claims, polyester resin refers to the product of polyhydric alcohols and polybasic acids composed of ester linkages in which either or both the alcohol or organic acid portion was polyfunctional and which resins have a minimum molecular weight of 500 and an acid value no greater than about 20. Such resins are also known as alkyd resins. In general, the water soluble polyesters utilized in the present invention may comprise:

Oil or fatty acid _____ Up to 90%
Polyglycols _____ 10 to 70%
Polybasic acids_____ Up to 50%
Polyhydric alcohols, other than polyglycols_ Up to 20%

Water soluble polyester resins as referred to in this application include those soluble in dilute alkaline solutions if not directly soluble in water.

The non-water soluble polyester resins which may be emulsified in accordance with the present invention may have components within the same general ranges except that the polyglycols may range from 0 to 35%. The non-water soluble polyester resins are characterized by their insolubility in water even in the presence of ammonia or volatile amines.

The oil or fatty acid of the resins may be a natural glyceride oil or a fatty acid derived thereof. The polybasic acids may be selected from acids such as phthalic anhydride, isophthalic acid, terephthalic acid, maleic acid, fumaric acid, itaconic acid, succinic acid, trimelletic and others of this type. The polyhydric alcohols can be selected from such polyols as glycerine, pentaerythritols, sorbitol, trimethylol propane or trimethylol ethane, and glycols such as ethylene, propylene, and butylene glycols. The polyglycols may be the polyethylene or polypropylene glycols ranging in molecular weight from about 300 to about 3000. Preferably the resins contain between 30% to 60% of such interacted polyglycols.

The polyesters may be modified by rosin or rosin derivatives, phenolic modifiers, hydrocarbon resin derivatives such as monomers or polymers of terpene, styrene, vinyl toluene, cyclopentodiene, butadiene or isobutylene, or by acrylate or silicone monomers.

Preferably emulsification of oil modified, water insoluble polyester resins is attained by mixing such resins with an aqueous solution of a water soluble polyester resin. If the water insoluble polyester resin is not of sufficient fluidity to permit ready mixing with the aqueous solution, it may be solubilized by heating or by dissolving it in a suitable water miscible solvent such as, for example, 2-ethoxyethanol, diethylene glycol ethylether, butyl alcohol and the like. In some instances, it is preferred to blend the water soluble and water insoluble resins and thereafter add the blended resins to water or add water to the blended resins.

The emulsions of the invention preferably comprise on a weight basis between about 5 to 35% of the emulsifying water soluble polyester and between about 65 to 95% of the emulsified water insoluble polyester.

The emulsions of the invention are useful coating compositions and for that purpose are mixed with suitable metal driers such as cobalt driers and pigment may be dispersed therein by any suitable means such as by grinding. The water soluble polyester resin does in fact appear to act as a dispersing aid by reason of its nonionic and anionic character.

Coating compositions made with emulsions prepared in accordance with the invention undergo major chemical changes when deposited as a film and lose their water sensitivity. The ammonia evaporates and the oil portions of both polyesters present therein undergo oxidation polymerization in the presence of the drier metal catalyst to give higher molecular weight components which are not soluble or emulsifiable in water or alkaline solutions.

The invention will be further described in conjunction with the following specific examples in which proportions are given in parts by weight. The examples are merely illustrative and it is not intended the invention is to be limited to the details set forth.

*Example I*

Utilizing conventional techniques, four water insoluble polyester resins were prepared of components in the following proportions:

|  | Resin #1, Parts | Resin #2, Parts | Resin #3, Parts | Resin #4, Parts |
|---|---|---|---|---|
| Safflower oil | 1,700 | 1,700 |  |  |
| Soya oil |  |  | 1,340 | 1,340 |
| Pentaerythritol | 291 | 285 |  |  |
| Glycerine |  |  | 368 | 368 |
| Polyglycol (mol. wt.=400) |  | 25 |  |  |
| Polyglycol (mol. wt.=600) |  |  |  | 25 |
| Isophthalic acid | 650 | 625 | 848 | 848 |
| Benzoic acid |  |  | 60 | 60 |
| Gross | 2,641 | 2,635 | 2,616 | 2,641 |
| Net After Water Loss | 2,500 | 2,500 | 2,423 | 2,448 |
| Acid Value | 20 | 17.5 | 16-17 | 16-17 |

*Example II*

Again using conventional techniques, water soluble polyester resins were prepared of reactants in the following proportions:

|  | Resin #5 | Resin #6 |
|---|---|---|
| Safflower oil | 780 | 850 |
| Pentaerythritol | 93 | 20 |
| Polyglycol (mol. wt.=400) | --- | 1,300 |
| Polyglycol (mol. wt.=600) | 1,300 | --- |
| Isophthalic acid | 546 | 546 |
| Gross | 2,719 | 2,716 |
| Net After Water Loss | 2,601 | 2,598 |

In reacting resin #5 the reaction was controlled to produce products having acid values of 10, 15 and 20, respectively. Resin #6 had an acid value (A.V.) of 14.

*Example III*

Aqueous solutions of resins #5 and #6 were then prepared as shown in the following table where the numerals indicate parts by weight:

|  | Solution | | | | | |
|---|---|---|---|---|---|---|
|  | A | B | C | D | E | F |
| Resin #5 A.V.=10 | 100 | 50 | --- | 50 | --- | --- |
| Resin #5 A.V.=15 | --- | --- | 50 | --- | --- | --- |
| Resin #5 A.V.=20 | --- | --- | --- | --- | 50 | --- |
| Resin #6 | --- | --- | --- | --- | --- | 59 |
| Water | 818 | 306.5 | 308 | 314 | 315 | 383 |
| Concentrated Ammonia | 11 | 5 | 4 | 3 | 4 | 4 |

The resin in each instance was mixed with half the water specified and the ammonia then added. Thereafter the balance of the water was added and the resulting mixture agitated until the resin was solubilized.

Aqueous emulsions of resins #1, #2, #3 and #4 were then prepared as follows:

*Example IV*

| | Parts |
|---|---|
| Solution A | 929 |
| Resin #1 | 453 |

Resin #1 was heated to 100° C. and added to solution A heated to 60° C. over a ten minute period while agitating. The agitation was then continued for 30 minutes while cooling to room temperature. The resulting emulsion had 40% solids, pH=7.7 and an initial viscosity of 6,100 centipoises.

*Example V*

| | Parts |
|---|---|
| Solution B | 261.5 |
| Resin #2 | 204.5 |

Resin #2 was heated to 100° C. and added to solution B heated to 60° C. over a ten minute period while agitating. The agitation was then continued for 30 minutes while cooling to room temperature. The emulsion produced had 45% solids content, pH=8.2 and an initial viscosity of 10,000 centipoises.

*Example VI*

| | Parts |
|---|---|
| Solution C | 362 |
| Resin #3 | 205 |

Resin #3 was heated to 135° C. and added to solution C heated to 60° C. over a ten minute period while agitating. The agitation was then continued for 30 minutes while cooling to room temperature. The emulsion produced had solids content=45%, pH=8.2 and viscosity=7,200 centipoises.

*Example VII*

| | Parts |
|---|---|
| Solution D | 367 |
| Resin #4 | 210 |

Resin #4 was heated to 135° C. and added to solution D heated to 60° C. over a ten minute period while agitating. The agitation was then continued for 30 minutes while cooling to room temperature. The resulting emulsion had 45% solids; pH=7.5 and viscosity=7,000 centipoises.

*Example VIII*

| | Parts |
|---|---|
| Solution E | 378 |
| Resin #4 | 259 |

Resin #4 was heated to 135° C. and added to solution E heated to 60° C. over a ten minute period while agitating. The agitation was then continued for 30 minutes while cooling to room temperature. The final emulsion had 50% solids, pH=7.5 and viscosity=6,500 centipoises.

*Example IX*

| | Parts |
|---|---|
| Solution F | 446 |
| Resin #4 | 258.5 |

Resin #4 was heated to 135° C. and added to solution F heated to 60° C. over a ten minute period while agitating. The agitation was then continued for 30 minutes while cooling to room temperature. The resulting emulsion had 45% solids, pH=7.6 and viscosity=2,100 centipoises.

The emulsions produced in Examples IV to IX were exceedingly fine having an average particle size below one micron. The emulsions were stable and exhibited good storage life.

It is to be observed that both the emulsified and emulsifier polyester resins are of low acid value which is of advantage, of course, in minimizing pigment reactivity and water solubility in the applied film coatings.

Having illustrated and described certain preferred embodiments of the invention, it should be apparent to those skilled in the art that the invention permits of modification in arrangement and detail. We claim as our invention all such modifications as come within the true spirit and scope of the appended claims.

We claim:

1. A coating composition comprising an aqueous emulsion of a water insoluble, drying oil modified polyester resin and a water soluble, drying oil modified polyester resin composed of approximately 50% long chain interacted polyglycols, having a molecular weight of between about 300 to 3000, said resins having an acid value no greater than about 20.

2. A coating composition comprising an aqueous emulsion of a water insoluble, drying oil modified polyester resin and a water soluble, drying oil modified polyester resin composed of between about 30 to 60% long chain interacted polyglycols, having a molecular weight of between about 300 to 3000, said resins having an acid value no greater than about 20.

3. A coating composition comprising an aqueous emulsion of a mixed resin composed of 65 to 95% by weight of a water insoluble, drying oil modified polyester resin an acid value no greater than 20 and 5 to 35% by weight of a water soluble, drying oil modified polyester resin having a minimum molecular weight of 500 and an acid value no greater than 20 and composed of between about 30% and 60% long chain interacted polyglycols having a molecular weight of between about 300 to 3000.

4. The process of forming an aqueous emulsion of a water insoluble, oil modified polyester resin which comprises forming an aqueous solution of an oil modified polyester resin composed of between about 30 to 60% long chain interacted polyglycols having a molecular weight of between about 300 to 3000 and adding to said solution while agitating a water insoluble, oil modified polyester resin, said resins having an acid value no greater than about 20.

5. The process of forming an aqueous emulsion of a water insoluble, oil modified polyester resin which comprises forming an aqueous solution of an oil modified polyester resin composed of between about 30 to 60% long chain interacted polyglycols having a molecular weight of between about 300 to 3000, and thereafter adding a fluidized water insoluble, oil modified polyester resin to said solution, said resins having an acid value no greater than about 20.

6. The process of forming an aqueous emulsion of a water insoluble, oil modified polyester resin which comprises emulsifying said resin with a water soluble, oil modified polyester resin composed of between about 30% to 60% long chain interacted polyglycols having a molecular weight of between about 300 to 3000, said resins having an acid value no greater than about 20.

References Cited in the file of this patent

UNITED STATES PATENTS

| 1,967,220 | Barrett et al. | July 24, 1934 |
| 2,884,404 | Parker | Apr. 28, 1959 |
| 2,915,486 | Shelley | Dec. 1, 1959 |
| 2,962,461 | Toussaint et al. | Nov. 29, 1960 |
| 2,973,331 | Kraft | Feb. 28, 1961 |

FOREIGN PATENTS

| 30,858 | Australia | Nov. 30, 1931 |
| 159,672 | Australia | Nov. 8, 1954 |
| 562,913 | Canada | Sept. 9, 1958 |
| 693,188 | Great Britain | June 24, 1953 |